Aug. 6, 1935.  J. L. DRAKE  2,010,063
SHEET GLASS APPARATUS
Filed July 9, 1932  2 Sheets-Sheet 1
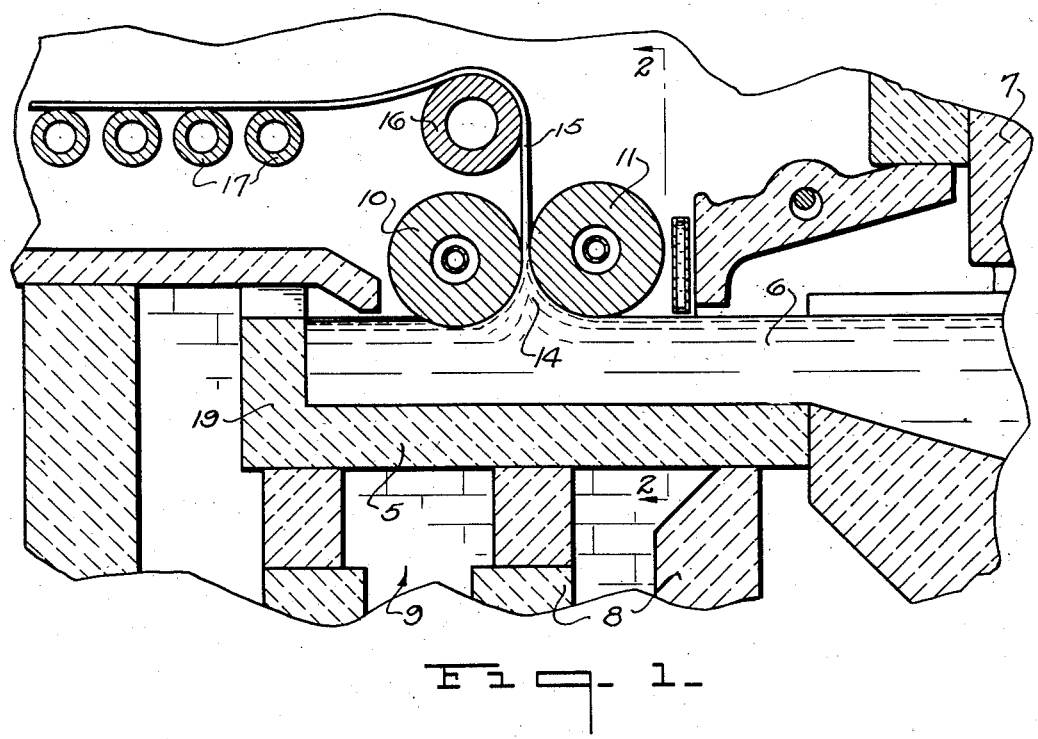
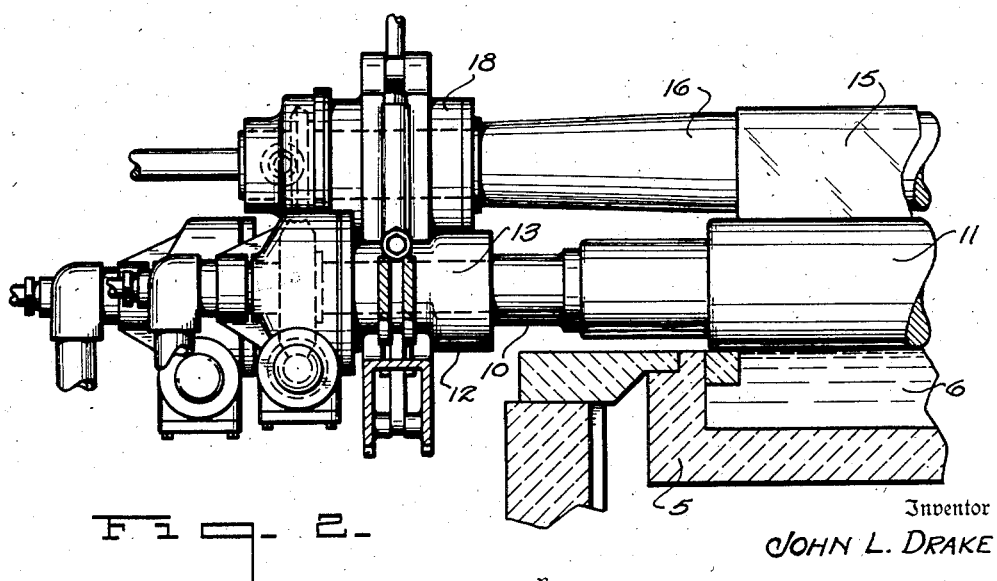
Inventor
JOHN L. DRAKE
By Frank Fraser
Attorney Aug. 6, 1935.   J. L. DRAKE   2,010,063
SHEET GLASS APPARATUS
Filed July 9, 1932   2 Sheets-Sheet 2

Inventor
John L. Drake.
By Frank Fraser
Attorney

Patented Aug. 6, 1935

2,010,063

UNITED STATES PATENT OFFICE 2,010,063

SHEET GLASS APPARATUS

John L. Drake, Toledo, Ohio, assignor to Libbey-Owens-Ford Glass Company, Toledo, Ohio, a corporation of Ohio Application July 9, 1932, Serial No. 621,613

6 Claims. (Cl. 49—33)

The present invention relates to improvements in sheet glass forming apparatus.

This invention has utility when incorporated in a rolling machine for producing continuous sheet glass wherein a pair of horizontally arranged forming rolls are positioned above a working receptacle containing a mass of molten glass, said rolls being spaced from one another to create a vertical sheet forming pass therebetween and being positively driven in a manner to draw a relatively heavy body of glass upwardly from the molten mass and reduce it to a sheet of substantially predetermined and uniform thickness. In order that proper formation of the sheet may take place, it is of course essential that sufficient glass be supplied to the forming rolls in order that an actual rolling of the glass may be achieved.

An important object of the invention resides in the positioning of the forming rolls relative to one another and to the molten mass of glass within the working receptacle in such a manner as to facilitate the supplying of the molten glass to the forming pass, whereby the requisite amount of glass necessary at the sheet forming pass to permit an actual rolling thereof will be assured.

Another object of the invention resides in the positioning of the forming rolls in such a manner that the glass supplied to the closed end of the working receptacle will be hotter than heretofore whereby the tendency toward stagnation of the glass within this end of the receptacle will be reduced to a minimum.

Other objects and advantages of the invention will become more apparent during the course of the following description when taken in connection with the accompanying drawings.

Figure 3:
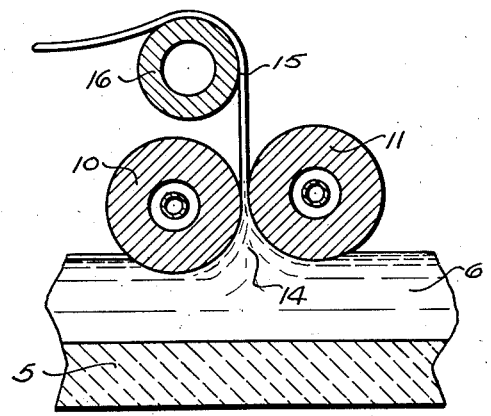
Figure 4:
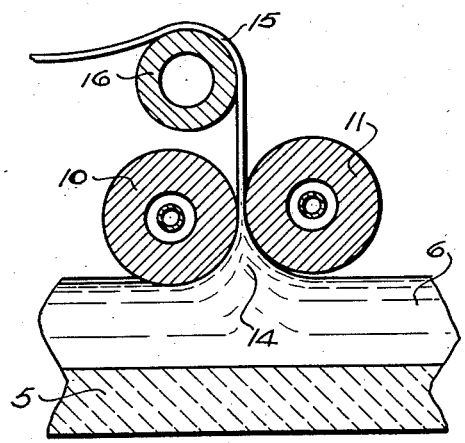

In the drawings forming a part of this application and wherein like numerals are employed to designate like parts throughout the same, Fig. 1 is a vertical longitudinal section through sheet glass rolling apparatus embodying the present invention, Fig. 2 is a transverse section therethrough taken substantially on line 2—2 of Fig. 1, Fig. 3 is a view somewhat similar to Fig. 1 but showing the forming rolls in a different position with respect to the mass of molten glass, and Fig. 4 is a similar view showing a still further positioning of the forming rolls.

Referring now to the drawings and particularly to Figs. 1 and 2, the numeral 5 designates a relatively shallow working receptacle or pot containing a mass of molten glass 6 supplied thereto from any suitable type of glass melting furnace 7.

The working receptacle 5 is ordinarily supported upon stools 8 arranged within a suitable heating chamber 9.

Positioned above the working receptacle 5 and extending transversely thereof is a pair of horizontal sheet forming rolls 10 and 11 spaced from one another to create a vertical sheet forming pass therebetween, the width of which determines the thickness of sheet produced. The forming rolls 10 and 11 are rotatably supported at each end within bearings 12 and 13 respectively and are positively driven in any desired manner so that, upon rotation thereof, the said rolls are adapted to draw a relatively heavy body of glass 14 upwardly from the molten mass 6 and reduce the same to a sheet 15 of substantially predetermined and uniform thickness.

As herein shown, the glass sheet 15 is continued upwardly for a relatively short distance beyond the forming rolls 10 and 11 and is then deflected about a rotatable member or roll 16 into a substantially horizontal plane wherein it is supported and carried along upon a series of horizontally arranged conveyor rolls 17 into an annealing leer (not shown). The bending roll 16 may be rotatably supported at each end within a bearing 18, and while preferably positively driven, may be permitted to idly rotate if desired.

As pointed out hereinabove, it is essential, in order to effect an actual rolling of the upwardly moving body of glass 14 to a sheet of substantially predetermined and uniform thickness, that a sufficient amount of glass be at all times supplied to the sheet forming pass to permit of such rolling. In sheet glass rolling machines of the type illustrated, the supply of molten glass to the closed end 19 of working receptacle 5 beyond the point of draw must obviously flow beneath the surface toward this end since the surface glass is being drawn upwardly. There is a tendency for the greater portion of the upper flow of glass into the sheet to be from the end toward the furnace so that if care is not taken, stagnation of the glass in the closed end of the receptacle may occur.

Heretofore, it has been proposed to position the forming rolls 10 and 11 either spaced above the mass of molten glass 6 or to immerse the lower portions of the peripheries of the rolls therein. When the rolls are immersed within the molten glass, the movement of the glass to the sheet forming pass, and especially from the closed end of the receptacle, may be initially facilitated. However, when so positioned, the forming rolls, and especially that roll adjacent the furnace, has a decided cooling action upon the glass, tending to chill the glass passing to the closed end of the receptacle, with the result that it has a tendency to become stagnant, as a consequence of which the movement of the glass to the sheet forming pass is rendered more difficult. On the other hand, when the forming rolls are spaced above the surface of the molten glass, the glass is of course not subjected to as great a cooling action so that hotter glass can be supplied to the closed end of the receptacle. However, when the rolls are in this position, the feeding of the molten glass to the sheet forming pass is made more difficult.

It is an aim and object of this invention to so position the forming rolls 10 and 11 relative to one another and to the mass of molten glass that not only will the requisite amount of glass be supplied to the sheet forming pass to permit an actual rolling thereof, but also whereby hotter glass may be supplied to the closed end of the receptacle, which will tend to reduce stagnation and the formation of dog metal to a minimum, and likewise facilitate the movement of the glass from this end of the receptacle to the forming pass. Briefly stated, these objects are accomplished by positioning the forming roll 10 adjacent the closed end 19 of working receptacle 5 at a relatively lower level than the forming roll 11 and in maintaining the roll 10 immersed within the molten mass of glass 6 while the roll 11 may be either spaced above the molten mass, located at the level thereof or immersed slightly therein. By way of example only, the roll 10 may be disposed approximately three-quarters of an inch below the level of roll 11, and this difference in level is maintained regardless of the positioning of the rolls relative to the mass of molten glass 6.

As illustrated in Fig. 1, the forming roll 10 has the lower portion of its periphery slightly immersed within the mass of molten glass 6, while the roll 11 is arranged at substantially the level of the molten mass, being neither above nor beneath the same. With this arrangement, the roll 11 will not have such a decided cooling action upon the glass passing to the closed end of the receptacle so that the glass supplied to this end of the receptacle will be hotter than if this roll were immersed in the molten mass. On the other hand, since the roll 10 is immersed within the molten glass, the movement of the glass from the closed end of the receptacle to the sheet forming pass can be more readily effected than if this roll were also at the surface of the molten glass. Since the glass passing to the closed end of the receptacle is hotter, the movement thereof to the forming rolls will be easier to maintain, as a consequence of which a sufficient supply of glass will not only be delivered to the sheet forming pass but, in addition, the tendency of the glass to become stagnant and devitrified within the closed end of the receptacle will be greatly reduced.

In Figs. 3 and 4, the rolls 10 and 11, while being positioned relative to one another in the same manner as in Fig. 1, are shown as being positioned differently with respect to the mass of molten glass 6. However, in each of these cases the roll 10 is immersed within the molten glass, with the roll 11 being arranged at a slightly higher level so as to reduce the cooling effect upon the glass passing therebeneath. For instance, in Fig. 3 both of the rolls 10 and 11 are immersed within the molten glass 6, but the roll 10 is immersed to a relatively greater depth than roll 11. Obviously, the chilling effect of roll 11 upon the glass will not be as great as if this roll were immersed within the glass to the same depth as roll 10. In Fig. 4, the roll 10 is immersed within the molten glass, whereas the roll 11 is spaced thereabove to further reduce the cooling effect thereof upon the molten glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, an upwardly opening receptacle having a closed end and an open end and containing a mass of molten glass providing an open unrestricted working area, a pair of horizontal driven forming rolls positioned transversely over the working area and arranged to provide a substantially vertical pass therebetween, said rolls being adapted to draw a relatively heavy body of molten glass upwardly from substantially the surface of said mass and reduce it to a sheet of substantially predetermined thickness, the forming roll adjacent the closed end of the receptacle being disposed at a relatively lower level than the roll adjacent the open end of said receptacle.

2. In sheet glass apparatus, an upwardly opening receptacle having a closed end and an open end and containing a mass of molten glass providing an open unrestricted working area, a pair of horizontal driven forming rolls positioned transversely over the working area and arranged to provide a substantially vertical pass therebetween, said rolls being adapted to draw a relatively heavy body of molten glass upwardly from substantially the surface of said mass and reduce it to a sheet of substantially predetermined thickness, the forming roll adjacent the closed end of the receptacle being immersed in the molten glass and disposed at a relatively lower level than the roll adjacent the open end of said receptacle, and a third roll mounted above the forming rolls for deflecting the sheet from the vertical into the horizontal plane.

3. In sheet glass apparatus, a receptacle containing a mass of molten glass and having a closed end and an open end, a pair of horizontal driven forming rolls positioned transversely above the receptacle inwardly of the closed end thereof and arranged to provide a substantially vertical pass therebetween, said rolls being adapted to draw a relatively heavy body of molten glass upwardly from said mass and reduce it to a sheet of substantially predetermined thickness, the forming roll adjacent the closed end of the receptacle being immersed in the molten glass, with the roll adjacent the open end of said receptacle having its periphery located at substantially the surface of the molten glass.

4. In sheet glass apparatus, a receptacle containing a mass of molten glass and having a closed end and an open end, a pair of horizontal driven forming rolls positioned transversely above the receptacle inwardly of the closed end thereof and arranged to provide a substantially vertical pass therebetween, said rolls being adapted to draw a relatively heavy body of molten glass upwardly from said mass and reduce it to a sheet of substantially predetermined thickness, the forming roll adjacent the closed end of the receptacle being immersed in the molten glass, with the roll adjacent the open end of said receptacle having its periphery located at substantially the surface of the molten glass, and a third roll mounted above the forming rolls for deflecting the sheet from the vertical into the horizontal plane.

5. In sheet glass apparatus, a receptacle containing a mass of molten glass and having a closed end and an open end, a pair of horizontal driven forming rolls positioned transversely above the receptacle inwardly of the closed end thereof and arranged to provide a substantially vertical pass therebetween, said rolls being adapted to draw a relatively heavy body of molten glass upwardly from said mass and reduce it to a sheet of substantially predetermined thickness, both of said forming rolls having their peripheries immersed within the mass of molten glass, with the roll adjacent the closed end of the receptacle being immersed to a relatively greater depth than the roll adjacent the open end thereof.

6. In sheet glass apparatus, a receptacle containing a mass of molten glass and having a closed end and an open end, a pair of horizontal driven forming rolls positioned transversely above the receptacle inwardly of the closed end thereof and arranged to provide a substantially vertical pass therebetween, said rolls being adapted to draw a relatively heavy body of molten glass upwardly from said mass and reduce it to a sheet of substantially predetermined thickness, both of said forming rolls having their peripheries immersed within the mass of molten glass, with the roll adjacent the closed end of the receptacle being immersed to a relatively greater depth than the roll adjacent the open end thereof, and a third roll mounted above the forming rolls for deflecting the sheet from the vertical into the horizontal plane.

JOHN L. DRAKE.